Oct. 27, 1964  P. J. GREENE, JR., ETAL  3,154,738
AUTOMATIC ENCODER TEST SET FOR PCM ENCODERS
Filed Nov. 9, 1961  2 Sheets-Sheet 1

INVENTORS
P.J. GREENE, JR.
O.L. WILLIAMS
R.E. YAEGER
BY
R. B. Ardis
ATTORNEY

INVENTORS P.J. GREENE, JR.
O.L. WILLIAMS
R.E. YAEGER

BY R. B. Andis

ATTORNEY 3,154,738
AUTOMATIC ENCODER TEST SET FOR PCM
ENCODERS
Patrick J. Greene, Jr., Plaistow, N.H., and Owen L.
Williams, Andover, and Robert E. Yaeger, Topsfield,
Mass., assignors to Bell Telephone Laboratories, Incorporated, New York, N.Y., a corporation of New York
Filed Nov. 9, 1961, Ser. No. 151,373
5 Claims. (Cl. 325—41)

This invention relates generally to systems that employ pulse code modulation (PCM) principles. It specifically concerns devices for testing the performance of PCM encoders.

As is well known an $n$-digit PCM encoder is a device whose function is to convert an input signal sample into binary code form. Such an encoder in idealized form is capable of generating $2^n$ distinct output code signals to represent $2^n$ equally divided amplitude levels of the input signal. Practical encoders, however, do not perform in such ideal fashion as they frequently do not provide a distinct code output for $2^n$ equally divided input levels. Often the input signal levels are divided on an unequal basis and it is therefore necessary to measure the variance of an encoder from the ideal.

In the past the determination of the decision levels of an encoder was obtained by applying a variable direct-current voltage to the input to the encoder, and recording the voltages at which the output code changes. The results obtained were then plotted to obtain an indication of the variance of the decision levels of the encoder from the ideal. This technique required $2^n$ measurements for an $n$-digit encoder, and in addition to being a long and tedious task (128 separate measurements in a seven-digit encoder) this technique is essentially a static one which does not include stray effects usually found by dynamic operation of the encoder, and a faster and more accurate technique is desirable.

Accordingly, it is an object of this invention to substantially shorten the time required to measure the deviation of an encoder from an ideal encoder.

It is a related object of this invention to eliminate the inaccuracies of measurement found in the prior art, by dynamically testing the encoder and thereby including dynamic stray effects in the measurement.

In accordance with this invention a PCM encoder is dynamically tested by having it continuously encode known voltages and comparing the resulting code output signals with the output of a code generator which is synchronized to the source of known voltages and produces binary code word outputs corresponding to the idealized decision levels of the encoder corresponding to the amplitudes of the known voltages.

In one embodiment of the invention the encoder encodes the output voltage of a linear ramp voltage source and the resulting digital code output is compared with the output of a binary word generator. The binary word generator generates binary code words which are synchronized to the source of ramp voltage so that the code output of the word generator represents the amplitude of the output voltage of the ramp voltage source. The outputs of the encoder and the word generator are compared on a digit-by-digit basis and an error output signal is generated whenever they differ.

The invention will be more fully comprehended from the following detailed description taken in conjunction with the drawings, in which.

Figure 1:
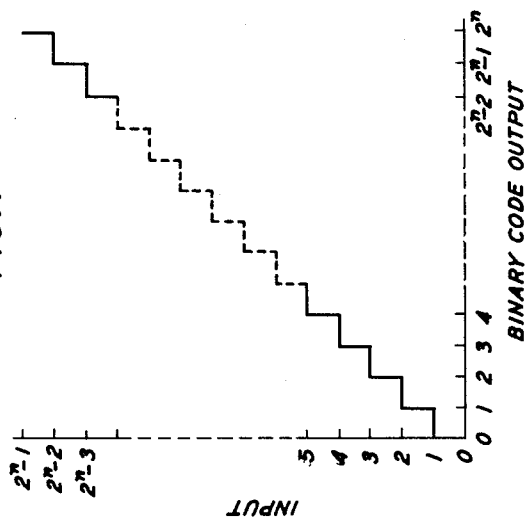
FIG. 1 is the input-output characteristic of an ideal encoder.

An idealized $n$-digit encoder has an input amplitude range of $2^n$ equally divided amplitude levels, and in response to an input signal a discrete code output representative of the amplitude of that signal is produced. In response to an input signal whose amplitude is that of the lowest level, represented by the region between the ordinates 0 and 1 on the vertical axis of the encoder characteristic shown in FIG. 1, a code output which represents the number zero in binary form is produced. When the input amplitude level is equal to or greater than the ordinate 1 the encoder produces a code output representing in binary form the number one. Between the ordinates 1 and 2 the encoder will produce a binary code output representing the number one, but when the input amplitude exceeds a value represented by ordinate 2 the encoder will produce a code output which in binary form represents the number two. This process of encoding results in an ideal encoder having a so-called "staircase" characteristic which is shown in FIG. 1. Each so-called "step" of the characteristic has the same height as every other "step" because the ideal encoder generates a distinct code output representing a given input level whenever the input signal is equal to that level or greater than it by an amount no greater than a step.

Figure 2:
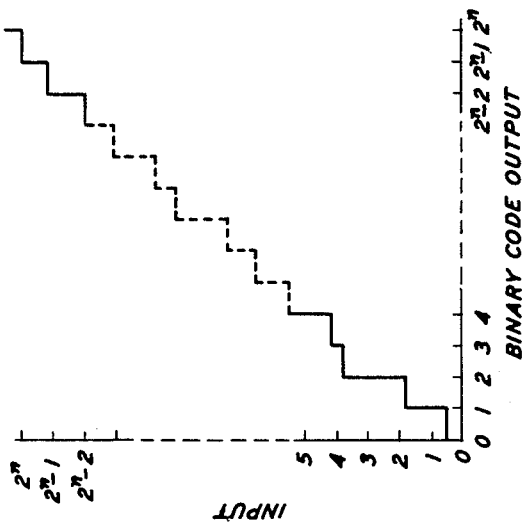
FIG. 2 is a likely-input output characteristic of a practical encoder.

Unfortunately practical encoders are unable to achieve the perfection depicted in FIG. 1, since they are not always capable of producing the proper code output in response to a particular level of the input signal. The result of such a deviation from the ideal is shown graphically in FIG. 2 where the input-output characteristic of a typical practical encoder is shown. Here the failure to produce the proper output code as above described results in an input-output characteristic having steps which vary considerably in height. Thus in the characteristic shown in FIG. 2 the encoder erroneously produces an output representing the number one when the input signal is considerably below the first ordinate on the vertical axis. Similarly, a code output representing the number two will be produced by an input signal whose amplitude is less than the second ordinate, while a code representing the third ordinate will not be produced until the amplitude of the input signal is almost equal to an amplitude represented by the fourth ordinate on the vertical axis.

Figure 3:
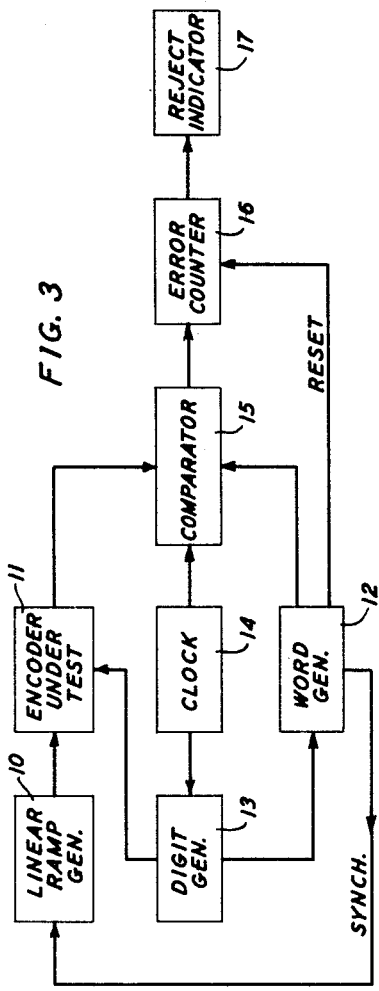
FIG. 3 is a block diagram of an encoder test set embodying the invention.

As discussed above, the input-output characteristics of an encoder were determined in the past by applying a variable direct-current voltage to the input of the encoder and measuring the input signal amplitudes at which the encoder output code change. This was essentially a static technique which did not take into account stray effects usually encountered in the dynamic operation of the encoder, and, in addition, was a slow and tedious process. In accordance with this invention, an encoder is tested by comparing its code output in response to a known input signal with an artificially generated standard which is synchronized to the known input signal, and a test circuit embodying this invention is shown in FIG. 3. Here a source 10 of a linearly increasing voltage is applied to an encoder 11 to be tested. The source 10 produces a linear ramp voltage whose initial amplitude corresponds to the amplitude for which an ideal encoder of the type under test will generate a code output which in binary form represents the number zero. The maximum voltage generated by source 10 corresponds to that amplitude for which an ideal encoder of the type under test will generate a binary code output which represents the number $2^n$. A standard code is artificially generated by word generator 12 and the output of the encoder in response to the voltage from source 10 is compared with the output of the word generator 12. The word generator 12 is a suitably triggered binary counter which produces $x$ word code repetitions: i.e., it repeats code zero $x$ times, code one $x$ times, code two $x$ times, and so forth, until code $2^n$ has been repeated $x$ times. The number of times, $x$ each code is repeated may be any number. The word generator 12 and the linear ramp generator 10 are synchronized and the magnitude and frequency of the ramp generator output adjusted to cause the output code of the encoder to agree with the code of the word generator 12 at the initial and maximum voltages of generator 10. With the end points synchronized in this fashion the encoder has $(x)2^n$ word times to go through the $2^n$ decision levels and it must therefore repeat the code for each input level $x$ times. The encoder and the word generator are mutually controlled by a digit pulse generator 13 which in turn is controlled by a source of clock pulses 14.

The digit code output of the encoder 11 and word generator 12 are applied to a comparator 15 which produces an output everytime the outputs of the encoder and the word generator disagree. The encoder under test is considered to be satisfactory or not satisfactory for the particular use for which it is planned in accordance with the number of errors committed in each $x$ word code repetition. The errors occurring during each $x$ word code are counted by error counter 16 which is reset at the end of each $x$ word code repetition. When the encoder has produced a number of errors during an $x$ word code repetition in excess of that number considered to be such that the encoder is not suited for a particular use reject indicator 17 produces an indication of that fact.

The operation of the encoder test set generally described above is more easily explained by considering a specific example. Consider, for example, the testing of a seven-digit encoder. Such an encoder produces a code word output occupying 8 time slots with the last seven time slots representing the input signal amplitude in binary code form. The first time slot of the last seven represents the most significant digit and the last time slot the least significant digit. The encoding of the signal in the seven time slots is governed by seven digit control pulses D2 through D8 which govern the weighing of the sample against the reference standards. These digit control pulses appear on separate control lines from digit generator 13 during the second through eighth time slots first while a digit control pulse D1 serves to reset the encoder to code another sample and provides an empty eighth time slot between code words.

Figure 4:
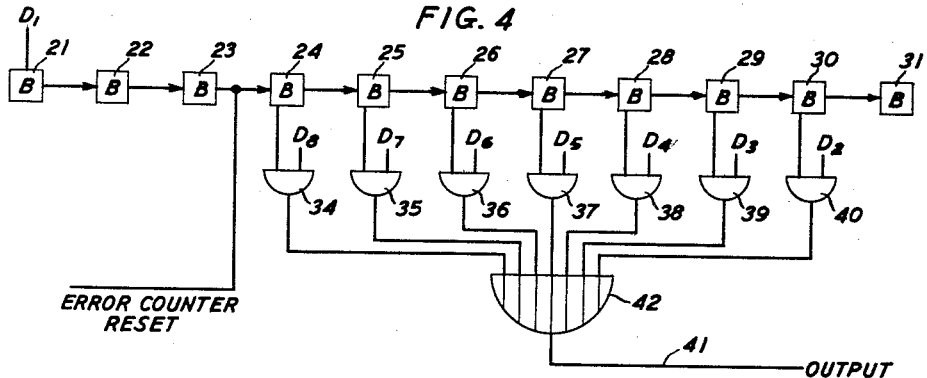
FIG. 4 is a block diagram of the word generator shown in FIG. 3.

To test such a seven-digit encoder a word generator 12 shown in block diagram form in FIG. 4 is employed. Here eleven binary counters 21 through 31 are connected together so that a change in state of a preceding counter triggers the succeeding counter. The input to the first binary counter 21 is connected to the output terminal of digit generator 13 on which digit control pulse D1 appears. As a result, an input pulse is applied to the first binary counter 21 at the beginning of each word of the encoder and, as a result, counter 21 changes states eight times during each word output of the encoder. Since binary counters 22 through 30 are connected to their immediately preceding counters so that they change states every other time the preceding counter changes states it is apparent that binary counter 24 changes states every eight word times of the encoder. Similarly, binary counter 25 changes states every sixteen word times and so forth through binary counter 30. As a result if the state of binary counter 24 is considered to represent the least significant digit of a seven-digit code and the states of the succeeding counters through counter 30 to represent increasingly significant digits then counters 24 through 30 form a counter whose output states in response to pulse D1, if made to appear during the seventh through second time slots, respectively, of a code word, represent the binary codes of the numbers zero through 127 repeated eight times each ($x=8$). The appearance of the states of the binary counters 24 through 30 at the proper times is assured through the use of AND gates 34 through 40 which apply the output voltages of counters 24 through 30, respectively, to output terminal 41 by means of OR gate 42. The gates 34–40 are rendered conductive at the proper times since the opening of the gates is controlled by digit control pulses D8 through D2, respectively.

Figure 5:
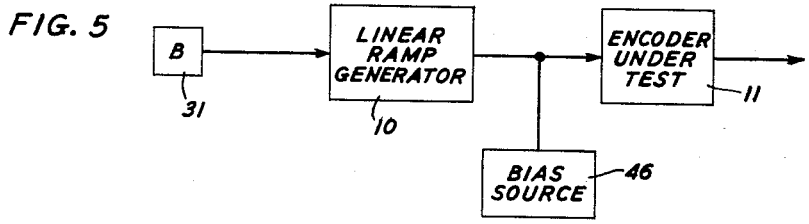
FIG. 5 is a block diagram of the linear ramp generator shown in FIG. 3.

The output of binary counter 30 is connected to the input of binary counter 31 which is not used to provide any portion of the standard code output but is used to synchronize the word generator 12 to the linear ramp generator. After code numbers zero through 127 have each been generated eight times ($x=8$) binary counter 31 changes states and this transition is applied as a synchronizing signal to the input of a voltage time base generator 10 shown in FIG. 5. Generator 10 may be any highly linear voltage time base generator and a suitable one is shown on page 213 of Pulse and Digital Circuits by Millman and Taub, published by McGraw-Hill Book Company, 1956. The initial output voltage is adjusted by means of a source 46 of bias voltage which is adjusted so that the initial voltage applied to the encoder 11 is of that amplitude for which the encoder should generate the output code for the number zero. The frequency of operation of the generator 10 is adjusted so that at the end of 128 eight word time repetitions the voltage applied to the encoder 11 is equal to that amplitude for which the encoder should generate the output code for the number 127. Between these two points of voltage the generator 10 generates a linearly increasing voltage, and during the 8(128) word times following the generation of a voltage for which the encoder should produce the code for number 127 the output voltage from generator 10 is retraced in response to the change of state of binary counter 31. Thus error counting is done on every other 1024, 8(128) word rate.

Figure 6:
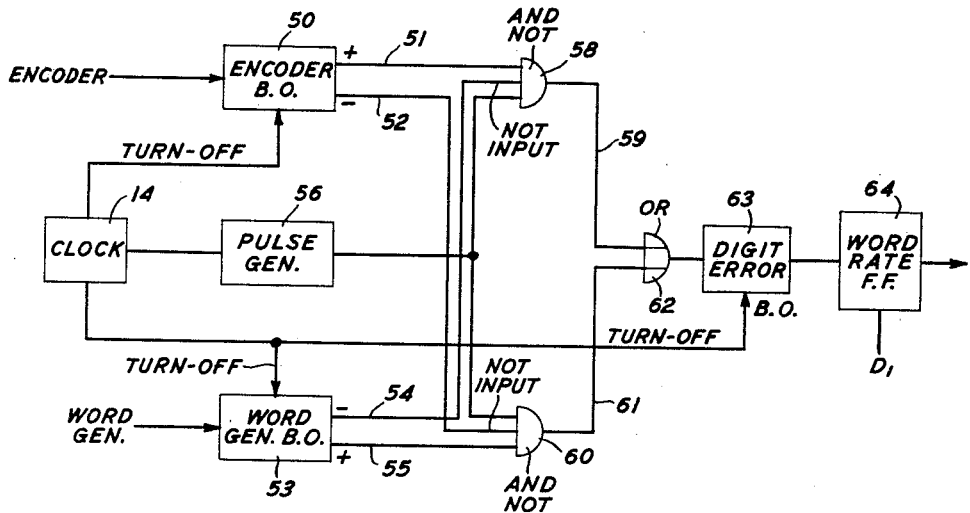
FIG. 6 is a block diagram of the comparator circuit shown in FIG. 3.

The comparator circuit 15 is shown in block diagram form in FIG. 6. The function of this circuit is to produce an output pulse whenever the code word output from the encoder 11 under test and the code word output from the word generator 12 differ. The output of the encoder is applied to an encoder blocking oscillator 50 which produces an output pulse on output terminal 51 in response to an input pulse from the encoder 11 and produces a negative voltage on output terminal 52 in response to an input pulse. When in a given time slot the encoder produces a space the encoder blocking oscillator 50 produces zero voltage on output terminal 51 and a positive voltage on output terminal 52. Word generator blocking oscillator 53 produces corresponding outputs at output terminals 55 and 54 in response to the input signal from the word generator 12. Thus when the word generator 12 produces an output pulse a positive voltage appears at terminal 55 and zero voltage at terminal 54, and when no pulse is produced by the word generator 12 during a given time slot zero voltage is present at terminal 55 and a positive voltage is present at terminal 54.

Blocking oscillators 50 and 53 are turned off in accordance with turn off pulses derived from the clock pulses, at the end of each time slot. The clock source 14 is also applied to a pulse generator circuit 56 which produces a very narrow output pulse centered in time in the middle of each time slot in response to the clock pulses from clock source 14.

It is the function of AND-NOT gate 58 to check for the commission of pulses by the encoder during no pulse time. Terminal 51 of blocking oscillator 50 is connected to one input of AND-NOT gate 58 and terminal 54 of word generator blocking oscillator 53 is connected to the NOT input of AND-NOT gate 58. The output of pulse generator 56 is applied to the third input terminal of AND-NOT gate 58 so that during the presence of a pulse output from pulse generator 56 an output pulse appears at output terminal 59 of AND-NOT gate 58 when a positive voltage is present on terminal 51 and a positive voltage is present on terminal 54. The output of AND-NOT gate 58 will produce no output signal in the event a pulse is present on terminal 51 and zero voltage is present on terminal 54 which is the condition indicating that the encoder and word generator have both produced an output pulse in a given time slot and that they are in agreement. Thus in the event the encoder has produced a pulse and the word generator has not produced a pulse an output pulse will be present at terminal 59 indicating that the encoder 11 has committed an error in erroneously producing the output pulse.

Whereas AND-NOT gate 58 checks for the commission of pulses during no pulse time, it is the function of AND-NOT gate 60 to check for the omission of pulses during a pulse time. Here terminal 52 of the encoder blocking oscillator 50 is used to inhibit AND-NOT gate 60 so that there will be no output present on terminal 61 of gate 60 whenever encoder blocking oscillator 50 generates a positive voltage in response to the encoder 11. Gate 60 will, however, generate a pulse in the absence of such a condition provided a pulse from pulse generator 56 is present and a positive voltage is present on terminal 55 indicating that the word generator blocking oscillator has generated a pulse in response to the generation of a pulse by the word generator 12. It should be understood that the roles of the word generator and encoder blocking oscillator inputs are reversed in gate 60 as compared to gate 58. A pulse is present at the output of gate 60 if there is a pulse from pulse generator 56 and a pulse from the word generator and not an encoder pulse. In gate 58, however, a pulse is generated if there is a pulse from generator 56 and there is an encoder pulse and not a word generator pulse.

The outputs of AND-NOT gates 58 and 60 are gated through an OR gate 62 to fire a blocking oscillator 63 called the digit error blocking oscillator. Blocking oscillator 63 generates an output pulse for every digit error, and this output pulse is applied to a bistable circuit 64 to cause it to change states. The bistable circuit 64 is called a word rate flip-flop and is set to one of its stable conditions by the application of digit pulse D1 and is caused to change states upon the occurrence of an output pulse from digit error blocking oscillator 63. The application of additional output pulses from blocking oscillator 63 before the word rate flip-flop is reset by control pulse D1 does not cause it to change states again and thus during each word, flip-flop 64 can only produce one output pulse to indicate that one or more errors have been committed during the eight time slots comprising a word.

The error counter 16 is a series of binary counters whose function is to count the number of errors produced during each eight word interval in which a given sample is applied to the encoder 11 and in which generator 12 generates a binary number representative of that sample. The counter 16 is reset at the end of each eight word interval by the change of state of binary counter 23 in the word generator circuit 12 whose output changes at that time. The binary counters of counter 16 are serially connected so that the first counter is initially set upon the occurrence of the first input pulse, the second counter upon the occurrence of the second input pulse, the third counter upon the occurrence of the fourth input pulse, and so forth, in accordance with the usual techniques for binary counting. If it has been predetermined that the encoder does not perform satisfactorily if four or more errors occur during any eight word interval than a three stage counter is used with the output generated by the third counter upon the occurrence of the fourth error used to trigger a reject indicator circuit 17 which indicates that the encoder does not meet specifications. The reject circuit may be any alarm, light or buzzer, and so forth. Should the encoder be considered to fail to meet specifications in the event two or more errors are committed during an eight word interval then the counter 16 may comprise only two binary counters with the output of the second counter in response to the second input pulse used to indicate a failure. Other methods of counting the number of errors during an eight word interval may be employed to trigger the reject indicator after any predetermined number of errors.

Thus in accordance with this invention the encoder is tested while actually encoding input signals with the accuracy of the encoder measured by comparing its digital output and an artificially generated digital signal standard. This measuring technique includes stray effects present only when the encoder is operating at its normal rate, and in addition is much faster than the technique employed in the prior art.

It is to be understood that the above-described arrangements are illustrative of the application of the invention. There is, for example, no necessity for limiting the input to the encoder 11 to a linearly increasing voltage and source 10 could be any other type of voltage. Source 10 could be, for example, a source of sinusoidal voltage and the word generator 12 would then generate a digital sine wave in order to test the encoder. In addition, the number of times ($t$) that each code word is repeated by word generator 12 is completely free of limitation. Finally, when the particular encoder under test does not provide a time slot separation between words then each word comprises $n$ time slots instead of $n+1$ time slots and each word repetition occurs in $x(n)$ time slots. Numerous other arrangements may be devised by those skilled in the art without departing from the spirit and scope of the invention.

What is claimed is:

1. A test circuit for testing the performance of a PCM encoder comprising, in combination, a PCM encoder to be tested having an input terminal and an output terminal, a source of varying voltage connected to the input of said encoder, a binary code word generator synchronized to said source of voltage to generate a series of binary code word output signals corresponding to the respective input signal amplitudes to said encoder, and means to compare the code signals produced at said encoder output terminal in response to said source voltage and the respective binary code words generated by said generator to produce an error signal when said code signals differ from the code words.

2. A test circuit for testing the performance of an $n$-digit PCM encoder comprising, in combination, an $n$-digit PCM encoder having an input terminal to which signal amplitude samples to be encoded are applied and an output terminal at which $n$-digit binary codes occupying $n$-successive time slots and representing said signal amplitude samples are produced, a source of linear ramp voltage connected to said input to said encoder, a binary code word generator to generate $n$-digit binary code words synchronized to said source of linear ramp voltage so that said code output of said generator represents the amplitude of said output voltage of said linear ramp voltage source during each $n$-digit time interval, means to compare the code signals produced at said encoder output in response to said linear ramp voltage and said code output of said binary word generator on a digit-by-digit basis and to generate a digit error output signal whenever the code signals differ in any time slot, and means responsive to said digit error signals to generate a single word error output signal in response to one or more digit error signals occurring in a given $n$-digit word.

3. A test circuit for testing the performance of an $n$-digit PCM encoder comprising, in combination, an $n$-digit PCM encoder having an input terminal to which signal amplitude samples to be encoded are applied and an output terminal at which $n$-digit binary codes occupying $n$-successive time slots and representing said signal amplitude samples are produced, a source of a linear ramp voltage connected to said input to said encoder whose initial output voltage is equal to that voltage at which said encoder should ideally generate the binary code number zero and whose maximum output voltage is equal to that voltage at which said encoder should ideally generate the binary code number $2^n-1$, a binary code word generator to generate $n$-digit binary code words synchronized to said source of linear ramp voltage so that said code output of said generator represents the amplitude of said output voltage of said linear ramp voltage source during each $n$-digit time interval, means to compare the code signals produced at said encoder output in response to said ramp voltage and said code output of said binary work generator on a digit-by-digit basis and to generate a digit error output signal whenever said outputs differ in any time slot, and means responsive to said digit error signals to generate a single word error output signal in response to one or more digit error signals occurring in a given $n$-digit word, and means responsive to a given number of word error output signals to indicate that the encoder under test does not meet predetermined requirements.

4. A test circuit for testing the performance of an $n$-digit PCM encoder comprising, in combination, an $n$-digit PCM encoder having an input terminal to which signal amplitude samples are applied and an output terminal at which an $n$-digit binary code occupying $n$-successive time slots representing said signal amplitude sample is produced, a source of a linear ramp voltage connected to the input to said encoder whose initial output voltage is equal to that voltage at which said encoder should ideally generate the binary code number zero and whose maximum output voltage is equal to that voltage at which said encoder should ideally generate the binary code number $2^n-1$ with the frequency of repetition of said output voltage of said ramp generator equal to $(x)2^n$ time slots, where $x$ is a predetermined number, a binary code word generator to generate $n$-digit binary codes and synchronized to said source of linear ramp voltage to generate $x$ identical binary words during each $x(n+1)$ time slots to represent the amplitude of said ramp generator during successive $x(n+1)$ time slots, means to compare the code signals produced at said encoder output in response to said ramp voltage and said code output of said binary code word generator on a digit-by-digit basis and to generate a digit error output signal whenever said outputs differ in any time slot, and means responsive to said digit error signals to generate a single word error output signal in response to one or more digit error signals occurring in a given $n$-digit word, and means responsive to a given number of word error output signals in $x(n+1)$ successive time slots to indicate that the encoder under test does not meet predetermined requirements.

5. A test circuit for testing the performance of an $n$-digit PCM encoder comprising, in combination, an $n$-digit PCM encoder having an input terminal to which signal amplitude samples are applied and an output terminal at which an $n$-digit binary code occupying $n$-successive time slots representing said signal amplitude sample is produced, a source of a linear ramp voltage connected to the input to said encoder whose initial output voltage is equal to that voltage at which said encoder should ideally generate the binary code number zero and whose maximum output voltage is equal to that voltage at which said encoder should ideally generate the binary code number $2^n-1$ with the frequency of repetition of said output voltage of said ramp generator equal to $(x)2^n$ time slots, where $x$ is a predetermined number, a binary code word generator to generate $n$-digit binary codes and synchronized to said source of linear ramp voltage to generate $x$ identical binary words during each $x(n)$ time slots to represent the amplitude of said ramp generator during successive $x(n)$ time slots, means to compare the code signals produced at said encoder output in response to said ramp voltage and said code output of said binary code word generator on a digit-by-digit basis and to generate a digit error output signal whenever said outputs differ in any time slot, and means responsive to said digit error signals to generate a single word error output signal in response to one or more digit error signals occurring in a given $n$-digit word, and means responsive to a given number of word error output signals in $x(n)$ successive time slots to indicate that the encoder under test does not meet predetermined requirements.

References Cited in the file of this patent

UNITED STATES PATENTS

| | | |
|---|---|---|
| 2,796,602 | Hess et al. | June 18, 1957 |
| 3,057,972 | Mann | Oct. 9, 1962 |